(12) United States Patent
Amdahl (10) Patent No.: US 10,833,943 B1
(45) Date of Patent: Nov. 10, 2020

(54) METHODS FOR SERVICE CHAINING AND DEVICES THEREOF

(71) Applicant: F5 Networks, Inc., Seattle, WA (US)

(72) Inventor: Saxon Amdahl, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 16/290,807

(22) Filed: Mar. 1, 2019

Related U.S. Application Data (60) Provisional application No. 62/636,929, filed on Mar. 1, 2018.

(51) Int. Cl.
*H04L 12/24* (2006.01)
*H04L 29/06* (2006.01)

(52) U.S. Cl.
CPC ...... *H04L 41/0893* (2013.01); *H04L 41/0896* (2013.01); *H04L 41/5009* (2013.01); *H04L 41/5019* (2013.01); *H04L 63/1441* (2013.01)

(58) Field of Classification Search
CPC ............ H04L 41/0893; H04L 41/0896; H04L 41/5009; H04L 41/5019; H04L 63/1441; H04L 63/0263; H04L 12/4633; H04L 45/64; G06F 11/3006; G06F 9/5044; H04M 15/66; H04W 12/06; H04W 4/08
See application file for complete search history.

(56) References Cited

U.S. PATENT DOCUMENTS

| 4,993,030 A | 2/1991 | Krakauer et al. |
| 5,218,695 A | 6/1993 | Noveck et al. |
| 5,303,368 A | 4/1994 | Kotaki |

(Continued)

FOREIGN PATENT DOCUMENTS

| AU | 2003300350 A1 | 7/2004 |
| CA | 2080530 A1 | 4/1994 |

(Continued)

OTHER PUBLICATIONS

Ott et al., "A Mechanism for TCP-Friendly Transport-level Protocol Coordination," USENIX Annual Technical Conference, University of North Carolina at Chapel Hill, pp. 1-12, Jun. 10, 2002.

(Continued)

*Primary Examiner* — Le H Luu
(74) *Attorney, Agent, or Firm* — Troutman Pepper Hamilton Sanders LLP (Rochester)

(57) ABSTRACT

Methods, non-transitory computer readable media, network traffic management apparatuses, and network traffic management systems that send a server response to a client request from a requesting client device to a service chaining device. A modified server response from the service chaining device is received based on a correlation of the server response to one or more service policies. A determination is made on whether the modified server response requires additional processing by one or more additional service chaining devices based on the modified server response. The processed server response is received from the one or more additional service chaining devices when the determination indicated processing was required. The processed server response is transmitted to the requesting client device.

20 Claims, 4 Drawing Sheets

(56) References Cited

U.S. PATENT DOCUMENTS

| | | |
|---|---|---|
| 5,473,362 A | 12/1995 | Fitzgerald et al. |
| 5,511,177 A | 4/1996 | Kagimasa et al. |
| 5,537,585 A | 7/1996 | Blickenstaff et al. |
| 5,548,724 A | 8/1996 | Akizawa et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,623,490 A | 4/1997 | Richter et al. |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,926,816 A | 7/1999 | Bauer et al. |
| 5,937,406 A | 8/1999 | Balabine et al. |
| 5,991,302 A | 11/1999 | Berl et al. |
| 5,995,491 A | 11/1999 | Richter et al. |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,104,706 A | 8/2000 | Richter et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,202,156 B1 | 3/2001 | Kalajan |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouimet et al. |
| 6,324,581 B1 | 11/2001 | Xu et al. |
| 6,329,985 B1 | 12/2001 | Tamer et al. |
| 6,339,785 B1 | 1/2002 | Feigenbaum |
| 6,349,343 B1 | 2/2002 | Foody et al. |
| 6,374,263 B1 | 4/2002 | Bunger et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,542,909 B1 | 4/2003 | Tamer et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,654,346 B1 | 11/2003 | Mahalingaiah et al. |
| 6,721,794 B2 | 4/2004 | Taylor et al. |
| 6,728,265 B1 | 4/2004 | Yavatkar et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,744,776 B1 | 6/2004 | Kalkunte et al. |
| 6,748,420 B1 | 6/2004 | Quatrano et al. |
| 6,754,215 B1 | 6/2004 | Arikawa et al. |
| 6,757,706 B1 | 6/2004 | Dong et al. |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,871,245 B2 | 3/2005 | Bradley |
| 6,880,017 B1 | 4/2005 | Marce et al. |
| 6,889,249 B2 | 5/2005 | Miloushev et al. |
| 6,914,881 B1 | 7/2005 | Mansfield et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,003,533 B2 | 2/2006 | Noguchi et al. |
| 7,006,981 B2 | 2/2006 | Rose et al. |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | McCann et al. |
| 7,024,427 B2 | 4/2006 | Bobbitt et al. |
| 7,039,061 B2 | 5/2006 | Connor et al. |
| 7,051,112 B2 | 5/2006 | Dawson |
| 7,054,998 B2 | 5/2006 | Arnott et al. |
| 7,072,917 B2 | 7/2006 | Wong et al. |
| 7,075,924 B2 | 7/2006 | Richter et al. |
| 7,089,286 B1 | 8/2006 | Malik |
| 7,111,115 B2 | 9/2006 | Peters et al. |
| 7,113,962 B1 | 9/2006 | Kee et al. |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,194,579 B2 | 3/2007 | Robinson et al. |
| 7,234,074 B2 | 6/2007 | Cohn et al. |
| 7,236,491 B2 | 6/2007 | Tsao et al. |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |

(56) References Cited

U.S. PATENT DOCUMENTS

| | | |
|---|---|---|
| 7,343,351 B1 | 3/2008 | Bishop et al. |
| 7,343,398 B1 | 3/2008 | Lownsbrough |
| 7,346,664 B2 | 3/2008 | Wong et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,440,982 B2 | 10/2008 | Lu et al. |
| 7,457,982 B2 | 11/2008 | Rajan |
| 7,467,158 B2 | 12/2008 | Marinescu |
| 7,475,146 B2 | 1/2009 | Bazot et al. |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,639,883 B2 | 12/2009 | Gill |
| 7,644,109 B2 | 1/2010 | Manley et al. |
| 7,653,699 B1 | 1/2010 | Colgrove et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,711,771 B2 | 5/2010 | Kimos |
| 7,734,603 B1 | 6/2010 | McManis |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,788,335 B2 | 8/2010 | Miloushev et al. |
| 7,793,342 B1 | 9/2010 | Ebrahimi et al. |
| 7,809,691 B1 | 10/2010 | Karmarkar et al. |
| 7,818,299 B1 | 10/2010 | Federwisch et al. |
| 7,822,939 B1 | 10/2010 | Veprinsky et al. |
| 7,831,639 B1 | 11/2010 | Panchbudhe et al. |
| 7,836,493 B2 | 11/2010 | Xia et al. |
| 7,849,112 B2 | 12/2010 | Mane et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,904,466 B1 | 3/2011 | Valencia et al. |
| 7,913,053 B1 | 3/2011 | Newland |
| 7,953,701 B2 | 5/2011 | Okitsu et al. |
| 7,958,347 B1 | 6/2011 | Ferguson |
| 8,005,953 B2 | 8/2011 | Miloushev et al. |
| 8,046,547 B1 | 10/2011 | Chatterjee et al. |
| 8,103,622 B1 | 1/2012 | Karinta |
| 8,112,392 B1 | 2/2012 | Bunnell et al. |
| 8,271,751 B2 | 9/2012 | Hinrichs, Jr. |
| 8,326,798 B1 | 12/2012 | Driscoll et al. |
| 8,351,600 B2 | 1/2013 | Resch |
| 2001/0007560 A1 | 7/2001 | Masuda et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |
| 2002/0073105 A1 | 6/2002 | Noguchi et al. |
| 2002/0083118 A1 | 6/2002 | Sim |
| 2002/0087887 A1 | 7/2002 | Busam et al. |
| 2002/0106263 A1 | 8/2002 | Winker |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0138502 A1 | 9/2002 | Gupta |
| 2002/0143909 A1 | 10/2002 | Botz et al. |
| 2002/0147630 A1 | 10/2002 | Rose et al. |
| 2002/0150253 A1 | 10/2002 | Brezak et al. |
| 2002/0156905 A1 | 10/2002 | Weissman |
| 2002/0161911 A1 | 10/2002 | Pinckney et al. |
| 2002/0188667 A1 | 12/2002 | Kimos |
| 2002/0194342 A1 | 12/2002 | Lu et al. |
| 2003/0005280 A1 | 1/2003 | Bobde et al. |
| 2003/0009429 A1 | 1/2003 | Jameson |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1 | 3/2003 | McCann et al. |
| 2003/0065956 A1 | 4/2003 | Belapurkar et al. |
| 2003/0115218 A1 | 6/2003 | Bobbitt et al. |
| 2003/0115439 A1 | 6/2003 | Mahalingam et al. |
| 2003/0128708 A1 | 7/2003 | Inoue et al. |
| 2003/0135514 A1 | 7/2003 | Patel et al. |
| 2003/0149781 A1 | 8/2003 | Yared et al. |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0200207 A1 | 10/2003 | Dickinson |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0017825 A1 | 1/2004 | Stanwood et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0044705 A1 | 3/2004 | Stager et al. |
| 2004/0054748 A1 | 3/2004 | Ackaouy et al. |
| 2004/0054777 A1 | 3/2004 | Ackaouy et al. |
| 2004/0093474 A1 | 5/2004 | Lin et al. |
| 2004/0098383 A1 | 5/2004 | Tabellion et al. |
| 2004/0098595 A1 | 5/2004 | Aupperle et al. |
| 2004/0133573 A1 | 7/2004 | Miloushev et al. |
| 2004/0133577 A1 | 7/2004 | Miloushev et al. |
| 2004/0133606 A1 | 7/2004 | Miloushev et al. |
| 2004/0133607 A1 | 7/2004 | Miloushev et al. |
| 2004/0133650 A1 | 7/2004 | Miloushev et al. |
| 2004/0133652 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0199547 A1 | 10/2004 | Winter et al. |
| 2004/0213156 A1 | 10/2004 | Smallwood et al. |
| 2004/0236798 A1 | 11/2004 | Srinivasan et al. |
| 2004/0267830 A1 | 12/2004 | Wong et al. |
| 2005/0021615 A1 | 1/2005 | Arnott et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0175013 A1 | 8/2005 | Le Pennec et al. |
| 2005/0187866 A1 | 8/2005 | Lee |
| 2005/0198501 A1 | 9/2005 | Andreev et al. |
| 2005/0213587 A1 | 9/2005 | Cho et al. |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0045096 A1 | 3/2006 | Farmer et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0123062 A1 | 6/2006 | Bobbitt et al. |
| 2006/0140193 A1 | 6/2006 | Kakani et al. |

(56) References Cited

U.S. PATENT DOCUMENTS

| | | |
|---|---|---|
| 2006/0153201 A1 | 7/2006 | Hepper et al. |
| 2006/0161518 A1 | 7/2006 | Lacapra |
| 2006/0167838 A1 | 7/2006 | Lacapra |
| 2006/0179261 A1 | 8/2006 | Rajan |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0206547 A1 | 9/2006 | Kulkarni et al. |
| 2006/0212746 A1 | 9/2006 | Amegadzie et al. |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1 | 11/2006 | Schaefer et al. |
| 2006/0268692 A1 | 11/2006 | Wright et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1 | 12/2006 | Mark et al. |
| 2007/0022121 A1 | 1/2007 | Bahar et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0053297 A1 | 3/2007 | Wu et al. |
| 2007/0088702 A1 | 4/2007 | Fridella et al. |
| 2007/0098284 A1 | 5/2007 | Sasaki et al. |
| 2007/0136308 A1 | 6/2007 | Tsirigotis et al. |
| 2007/0139227 A1 | 6/2007 | Speirs et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0226331 A1 | 9/2007 | Srinivasan et al. |
| 2008/0046432 A1 | 2/2008 | Anderson et al. |
| 2008/0070575 A1 | 3/2008 | Claussen et al. |
| 2008/0091807 A1* | 4/2008 | Strub .............. H04L 41/0893 709/223 |
| 2008/0104443 A1 | 5/2008 | Akutsu et al. |
| 2008/0114718 A1 | 5/2008 | Anderson et al. |
| 2008/0189468 A1 | 8/2008 | Schmidt et al. |
| 2008/0200207 A1 | 8/2008 | Donahue et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0282047 A1 | 11/2008 | Arakawa et al. |
| 2008/0294446 A1 | 11/2008 | Guo et al. |
| 2009/0007162 A1 | 1/2009 | Sheehan |
| 2009/0013138 A1 | 1/2009 | Sudhakar |
| 2009/0037975 A1 | 2/2009 | Ishikawa et al. |
| 2009/0041230 A1 | 2/2009 | Williams |
| 2009/0055507 A1 | 2/2009 | Oeda |
| 2009/0077097 A1 | 3/2009 | Lacapra et al. |
| 2009/0089344 A1 | 4/2009 | Brown |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0210875 A1 | 8/2009 | Bolles et al. |
| 2009/0240705 A1 | 9/2009 | Miloushev et al. |
| 2009/0240899 A1 | 9/2009 | Akagawa et al. |
| 2009/0254592 A1 | 10/2009 | Marinov et al. |
| 2009/0265396 A1 | 10/2009 | Ram et al. |
| 2010/0017643 A1 | 1/2010 | Baba et al. |
| 2010/0077294 A1 | 3/2010 | Watson |
| 2010/0082542 A1 | 4/2010 | Feng et al. |
| 2010/0205206 A1 | 8/2010 | Rabines et al. |
| 2010/0211547 A1 | 8/2010 | Kamei et al. |
| 2010/0325634 A1 | 12/2010 | Ichikawa et al. |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0107112 A1 | 5/2011 | Resch |
| 2011/0119234 A1 | 5/2011 | Schack et al. |
| 2011/0320882 A1 | 12/2011 | Beaty et al. |
| 2012/0144229 A1 | 6/2012 | Nadolski |
| 2012/0150699 A1 | 6/2012 | Trapp et al. |
| 2015/0207695 A1* | 7/2015 | Varney .............. H04L 41/0893 709/223 |
| 2017/0302470 A1* | 10/2017 | Clark ................. H04L 41/0893 |
| 2017/0332421 A1* | 11/2017 | Sternberg ............ H04L 12/4641 |
| 2017/0359252 A1* | 12/2017 | Kumar ............... H04L 12/4633 |
| 2018/0115468 A1* | 4/2018 | Bildhauer ............. G06F 9/5044 |
| 2018/0227185 A1* | 8/2018 | Turner ................ H04L 63/0263 |
| 2019/0018760 A1* | 1/2019 | Webb .................. G06F 11/3006 |
| 2019/0268232 A1* | 8/2019 | Garcia Azorero .... H04M 15/66 |
| 2019/0268384 A1* | 8/2019 | Hu ......................... H04L 45/64 |
| 2019/0349426 A1* | 11/2019 | Smith .................... H04L 69/22 |

FOREIGN PATENT DOCUMENTS

| | | |
|---|---|---|
| CA | 2512312 A1 | 7/2004 |
| EP | 0605088 A2 | 2/1996 |
| EP | 0738970 A1 | 10/1996 |
| JP | 63-10250 A | 1/1988 |
| JP | 06-205006 A | 7/1994 |
| JP | 06-332782 | 12/1994 |
| JP | 08-021924 B | 3/1996 |
| JP | 08-328760 A | 12/1996 |
| JP | 08-339335 | 12/1996 |
| JP | 09-16510 A | 1/1997 |
| JP | 11-282741 A1 | 10/1999 |
| JP | 2000-183935 | 6/2000 |
| NZ | 566291 A | 12/2008 |
| WO | 2002/039696 A2 | 5/2002 |
| WO | 2002/056181 A2 | 7/2002 |
| WO | 2004/061605 A2 | 7/2004 |
| WO | 2006/091040 A1 | 8/2006 |
| WO | 2008/130983 A1 | 10/2008 |
| WO | 2008/147973 A2 | 12/2008 |
| WO | 2009/064720 A2 | 5/2009 |

OTHER PUBLICATIONS

Padmanabhan et al., "Using Predictive Prefetching to Improve World Wide Web Latency", ACM SIGCOMM Computer Communication Review, vol. 26, No. 3, pp. 22-36, Jul. 1996.

Pashalidis et al., "A Taxonomy of Single Sign-On Systems," Australasian Conference on Informatiion Security and Privacy, pp. 249-264, Springer, Berlin, Heidelberg, Jul. 9, 2003.

Pashalidis et al., "Impostor: A Single Sign-On System for Use From Untrusted Devices," 5 pp, IEEE Global Telecommunications Conference, 2004, GLOBECOM '04, Nov. 29-Dec. 3, 2004.

Patterson et al., "A Case for Redundant Arrays of Inexpensive Disks (RAID)," SIGMOD '88 Proceedings of ACM SIGMOD International Conference on Management of Data, pp. 109-116, Jun. 1-3, 1988.

Pearson, Peter K, "Fast Hashing of Variable-Length Text Strings," Communications of the ACM, pp. 677-680, vol. 33, No. 6, Jun. 1990.

Peterson, Michael, "Introducing Storage Area Networks," Infostor, InfoStor, 6 pp, Feb. 1998.

Preslan et al., "Scalability and Failure Recovery in a Linux Cluster File System," in Proceedings of the 4th Annual Linux Showcase & Conference, 17 pp, Atlanta, Georgia, Oct. 10-14, 2000.

Rodriguez et al., "Parallel-Access for Mirror Sites in the Internet," Proceedings IEEE Infocom 2000, pp. 864-873, Conference on Computer Communications, Nineteenth Annual Joint Conference of the IEEE Computer and Communications Societies, Mar. 26, 2000.

Rosen et al., "MPLS Label Stack Encoding," Network Working Group, Request for Comments 3032, Standards Track, 23 pp, Jan. 2001.

"Welcome to the RSYNC Web Pages," RSYNC, http://samba.anu.edu.au/rsync/, Retrieved on Dec. 18, 2009.

(56) References Cited

OTHER PUBLICATIONS

Savage et al., "AFRAID—A Frequently Redundant Array of Independent Disks," Proceedings of the USENIX 1996 Annual Technical Conference, San Diego, California, Jan. 1996.
Soltis et al., "The Design and Performance of Shared Disk File System for IRIX," 6th NASA Goddard Space Flight Center Conference on Mass Storage & Technologies, 15th IEEE Symposium on Mass Storage Systems, 17 pp, Mar. 23-26, 1998.
Soltis et al., "The Global File System," 24 pages, Fifth NASA Goddard Conference on Mass Storage Systems and Technologies, NASA Conference Publication 3340, vol. II, Sep. 17-19, 1996.
Sorenson, K.M., "Installation and Administration" Kimberlite Cluster Version 1.1.0, Revision D, 136 pp, Mission Critical Linux, Dec. 2000.
Stakutis, Chris, "Benefits of SAN-Based File System Sharing," InfoStor, Jul. 2000.
Thekkath et al., "Frangipani: A Scalable Distributed File System," Proceedings of the 16th ACM Symposium on Operating Systems Principles, Oct. 1997.
"Microsoft Encyclopedia of Security," pp. 218, 300-301, Mitch Tulloch, Microsoft Press, Redmond, Washington, 2003.
Wang Bing, "Priority and Realtime Data Transfer Over the Best-Effort Internet," A Dissertation, UMI No. 3193954, Sep. 2005.
"Content-Centric Networking", Wikipedia, pp. 1-4, en.wikipedia.org/wiki/Content-centric_networking, Oct. 31, 2012.
Wilkes, J et al., "The HP AutoRAID Hierarchical Storage System," pp. 1-29, ACM Transactions on Computer Systems, vol. 14, No. 1, Feb. 1996.
Woo Thomas Y.C., "A Modular Approach to Packet Classification: Algorithms and Results," Proceedings IEEE Infocom 2000, Conference on Computer Communications, Nineteenth Annual Joint Conference of the IEEE Computer and Communications Societies, Cat. No. 00CH37064, vol. 3, Mar. 26-30, 2000.
Zayas, Edward R., "AFS-3 Programmer's Reference: Architectural Overview," AFS-3 Design Goals, Transarc Corporation, Version 1.0, Sep. 2, 1991.
"Ankeena is now part of Juniper Networks," AMDS-Ankeena, Obtained from http://www.ankeena.com/technology, 1 pp, last accessed Jun. 2, 2010.
"A Storage Architecture Guide," Second Edition, Auspex Systems, Inc., 71 pp, 2001.
"CSA Persistent File System Technology," Colorado Software Architecture, Inc., A White Paper, pp. 1-3, Jan. 1, 1999.
"Deploying the BIG-IP LTM With Multiple Big-IP AAM and ASM Devices," Deployment Guide, F5 Networks, Inc., pp. 1-14, Feb. 4, 2015.
"Distributed File System: Logical View of Physical Storage," White Paper, Microsoft Corp., pp. 1-26, last accessed on Dec. 20, 2002.
"How DFS Works: Remote File Systems," Distributed File System (DFS) Technical Reference, retrieved from the Internet on Feb. 13, 2009: URL:http://technetmicrosoft.com/en-us/library/cc782417.aspx>(2003).
"Disk Striping," NERSC Tutorials: I/O on the Cray T3E, Chapter 8, pp. 1-9, Feb. 21, 2002.
"Scaling Next Generation Web Infrastructure with Content-Intelligent Switching," White Paper, Alteon WebSystems, Inc., 10 pp, Apr. 2000.
"The AFS File System in Distributed Computing Environments," IBM, http://www_transarcibm_com/Library/whitepapers/AFS/afsoverview.html, 6 pp, last accessed Dec. 20, 2002.
"New VERITAS Volume Management and File System Technology for Cluster Environments," VERITAS SANPoint Foundation Suite™ and SANPoint Foundation Suite™ HA, VERITAS White Paper, VERITAS Software Corporation, 27 pp, Sep. 2001.
"Welcome to the RSYNC Web Pages," http://samba.anu.edu.au/rsync/, 5 pp, last accessed Dec. 18, 2009.
"Windows Clustering Technologies—An Overview," Microsoft® Windows® 2000 Server Technical Aid, 31 pp, Nov. 2001.

Aguilera et al., "Improving Recoverability in Multi-Tier Storage Systems," International Conference on Dependable Systems and Networks (DSN-2007), Edinburgh, Scotland, 10 pages, Jun. 2007.
Anderson et al., "Serverless Network File System, The 15th Symposium on Operating Systems Principles," Computer Science Division, University of California at Berkeley, pp. 1-18, Dec. 1995.
Anderson et al., "Interposed Request Routing for Scalable Network Storage," ACM Transactions on Computer Systems 20(1):25-48 (Feb. 2002).
"Tiger Developer Overview Series: Working with Spotlight," Apple Computer, Inc., <http://web.archive.org/web/20041123005335/developerapple.com/macosx/tiger/spotlight_html>, pp. 1-11, Nov. 2, 2004.
Transcription of "Mac Os X Keynote Intro. Part 2," Apple Computers, Inc., http://youtube.com/watch?v=zSBJwEmRJbY, pp. 1-6, Jun. 2004.
Basney et al., "Credential Wallets: A Classification of Credential Repositories Highlighting MyProxy," 31st Research Conference on Communication, Information and Internet Policy (TPRC 2003), pp. 1-20, Sep. 19-21, 2003.
Botzum, Keys, "Single Sign On—A Contrarian View," IBM Software Services for WebSphere, SSO—A Contrarian View, pp. 1-8, Aug. 6, 2001.
Cabrera et al., "Swift: A Storage Architecture for Large Objects," Digest of Papers Eleventh IEEE Symposium on Mass Storage Systems, Conference Paper, 7 pp, Oct. 7-10, 1991.
Cabrera et al., "Swift: Using Distributed Disk Striping to Provide High I/O Data Rates," Computing Systems, 4(1):405-436, Fall 1991.
Cabrera et al., "Using Data Striping in a Local Area Network," Technical Report UCSC-CRL-92-09, University of California at Santa Cruz, Mar. 1, 1992.
Callaghan et al., "NFS Version 3 Protocol Specification" Network Working Group, Request for Comments 1813, Category Informal, Sun Microsystems, Inc., 126 pp., Jun. 1995.
Carns et al., "PVFS: A Parallel File System for Linux Clusters," Proceedings of the Extreme Linux Track: 4th Annual Linux Showcase and Conference, 11 pp, Atlanta, Georgia, Oct. 10-14, 2000.
Cavale, Mohan., "Introducing Microsoft Cluster Service (MSCS) in the Windows Server 2003 Family," Microsoft Corporation, 10 pp, Nov. 2002.
English Translation of Notification of Reason(s) for Refusal for JP 2002-556371, Dispatch Date: Jan. 22, 2007.
Fan et al., "Summary Cache: A Scalable Wide-Area Protocol," CM SIGCOMM Computer Communications Review, 28(4), pp. 254-265.
Farley, Marc, "Building Storage Networks," Second Edition, Book Review, Osborne McGraw Hill, ISBN 0072120725, Aug. 6, 2002.
Gibson et al., "File Server Scaling with Network-Attached Secure Disks," Proceedings of the ACM International Conference on Measurement and Modeling of Computer Systems, 13 pages, (Sigmetrics '97), Seattle, Washington, Jun. 15-18, 1997.
Gibson et al., "NASD Scalable Storage Systems," Proceedings of USENIX 1999, Linux Workshop, Monterey, Califonia, pp. 1-6, Jun. 9-11, 1999.
Gupta et al., "Algorithms for Packet Classification," Stanford University, IEEE Network, pp. 24-32, Mar./Apr. 2001.
EP Response filed May 19, 2008 to Official EP Communication dated Nov. 9, 2007 in corresponding European Patent Application No. 02718824.2, 3 pp.
Hartman, John Henry, "The Zebra Striped Network File System," A dissertation submitted in partial satisfaction of the requirements for the degree of Doctor of Philosophy in Computer Science in the Graduate Division of the University of California at Berkeley, 160 pp, 1994.
Haskin et al., "The Tiger Shark File System," COMPCON '96, Technologies for the Information Superhighway Digest of Papers, Santa Clara, CA, Feb. 25-28, 1996.
Heinz II Gerald J, "Priorities in Stream Transmission Control Protocol (SCTP) Multistreaming," 35 pp, University of Delaware, Department of Computer and Information Sciences, Spring 2003.

(56) References Cited

OTHER PUBLICATIONS

Hwang et al., "Designing SSI Clusters with Hierarchical Checkpointing and Single I/O Space," IEEE Concurrency, 7(11):60-69, Jan.-Mar. 1999.

Ilvesmaki et al., "On the Capabilities of Application Level Traffic Measurements to Differentiate and Classify Internet Traffic," SPIE Proceedings Series, Denver, Colorado, 11 pp, Aug. 19-21, 2001.

Internet Protocol,"DARPA Internet Program Protocol Specification", (RFC: 791), prepared for Defense Advanced Research Projects Agency, Information Processing Techniques Office, Information Sciences Institute, University of Southern California, pp. 1-49, Sep. 1981.

Jacobson, Van, "A New Way to look at Networking," Google Tech Talks, (http://www.youtube.com/watch?r=oCZMoY3q2uM), 2 pp, Aug. 30, 2006.

Jacobson, Van, "Introduction to Content Centric Networking," FISS 09, Presentation, Bremen, Germany, 96 pp, Jun. 22, 2009.

Karamanolis et al., "An Architecture for Scalable and Manageable File Services," Internet Systems and Storage Laboratory, HP Laboratories, HPL-2001-173, 16 pp, Jul. 26, 2001.

Katsurashima. et al., "NAS Switch: A Novel CIFS Server Virtualization," Proceedings, 20th IEEE/11th NASA Goddard Conference on Mass Storage Systems and Technologies, (MSST 2003), 5 pp, 2003.

Kimball et al., "Automated Client-Side Integration of Distributed Application Servers," Proceedings of LISA '99: 13th Systems Administration Conference, pp. 275-282 of the Proceedings, Nov. 7-12, 1999.

Kohl et al., "The Kerberos Network Authentication Service (V5)," Network Working Group, Request for Comments 1510, pp. 1-112, Sep. 1993.

Lelil, S, "Storage Technology News: AutoVirt adds tool to help data migration projects," pp. 1-3 <http://searchstorage.techtarget.com/news/article/0,289142,sid5_gci1527986,00_html>, Feb. 25, 2011.

Long et al., "Swift/RAID: A Distributed RAID System," the Usenix Association, Computing Systems, vol. 7, No. 3, pp. 333-359, Summer 1994.

Modiano Eytan, "Scheduling Algorithms for Message Transmission Over a Satellite Broadcast System," MIT Lincoln Laboratory Advanced Network Group, pp. 1-7, Nov. 1997.

Noghani et al., "A Novel Approach to Reduce Latency on the Internet: Component-Based Download," Department of Electrical and Computer Engineering, Univesity of Manitoba, Winnipeg, Jun. 2000.

"Common Internet File System (CIFS) Version CIFS-Spec 0.9," Storage Networking Industry Association, Work Group In Progress, Revision Date: Mar. 26, 2001.

Novotny et al., "An Online Credential Repository for the Grid: MyProxy," Proceedings 10th IEEE International Symosium on High Performance Distributed Computing, 8 pp, Aug. 7-9, 2001.

* cited by examiner

Client device ➡ Network traffic management apparatus ➡ Security service chaining device ➡ Network traffic management apparatus ➡ Server device ➡ Network traffic management apparatus ➡ Service device ➡ Network traffic management apparatus ➡ Security service chaining device ➡ Network traffic management apparatus ➡ Client device

FIG. 4

METHODS FOR SERVICE CHAINING AND DEVICES THEREOF

This application claims the benefit of U.S. Provisional Patent Application Ser. No. 62/636,929, filed Mar. 1, 2018, which is hereby incorporated by reference in its entirety.

FIELD

This technology generally relates to methods and systems for service chaining in a network environment.

BACKGROUND

With prior technologies, service chaining in a communication network has been utilized to perform various functions including applying various services to data traffic requested by a client device. In particular, one of these applied services on data traffic has been a virus removal service where the data traffic is passed through antivirus scanner devices to detect, prevent, and remove viruses and other malicious threats. Unfortunately, these antivirus scanner devices are very expensive so this prior practice of routing all data traffic through antivirus scanner devices can be cost prohibitive and is not efficient.

SUMMARY

A method for service chaining, implemented in cooperation with a network traffic management system comprising one or more network traffic management modules, server modules, additional service modules, security service chaining modules or client modules, includes sending a server response to a client request from a requesting client device to a service chaining device. A modified server response from the service chaining device is received based on a correlation of the server response to one or more service policies. A determination is made on whether the modified server response requires additional processing by one or more additional service chaining devices based on the modified server response. The processed server response is received from the one or more additional service chaining devices when the determination indicated processing was required. The processed server response is transmitted to the requesting client device.

A network traffic management apparatus including memory including programmed instructions stored thereon and one or more processors configured to be capable of executing the stored programmed instructions to send a server response to a client request from a requesting client device to a service chaining device. A modified server response from the service chaining device is received based on a correlation of the server response to one or more service policies. A determination is made on whether the modified server response requires additional processing by one or more additional service chaining devices based on the modified server response. The processed server response is received from the one or more additional service chaining devices when the determination indicated processing was required. The processed server response is transmitted to the requesting client device.

A non-transitory computer readable medium having stored thereon instructions for including executable code that, when executed by one or more processors, causes the processors to send a server response to a client request from a requesting client device to a service chaining device. A modified server response from the service chaining device is received based on a correlation of the server response to one or more service policies. A determination is made on whether the modified server response requires additional processing by one or more additional service chaining devices based on the modified server response. The processed server response is received from the one or more additional service chaining devices when the determination indicated processing was required. The processed server response is transmitted to the requesting client device.

A network traffic management system includes one or more network traffic management modules, server modules, additional service modules, security service chaining modules or client modules, memory comprising programmed instructions stored thereon, and one or more processors configured to be capable of executing the stored programmed instructions to send a server response to a client request from a requesting client device to a service chaining device. A modified server response from the service chaining device is received based on a correlation of the server response to one or more service policies. A determination is made on whether the modified server response requires additional processing by one or more additional service chaining devices based on the modified server response. The processed server response is received from the one or more additional service chaining devices when the determination indicated processing was required. The processed server response is transmitted to the requesting client device.

This technology has a number of advantages including providing methods, non-transitory computer readable media, network traffic management apparatuses, and network traffic management systems that dynamically provide service chaining of devices where services are enabled as needed based on analysis of the response prior to final transmission of the modified response to the requesting client. With this technology, the requests are transmitted between the network traffic management apparatus and the service chaining devices in a manners so that only the responses are modified. As a result, any number of services can be seamlessly chained together with no externally visible side effects, such as redirects or duplicate requests.

DETAILED DESCRIPTION

Figure 1:
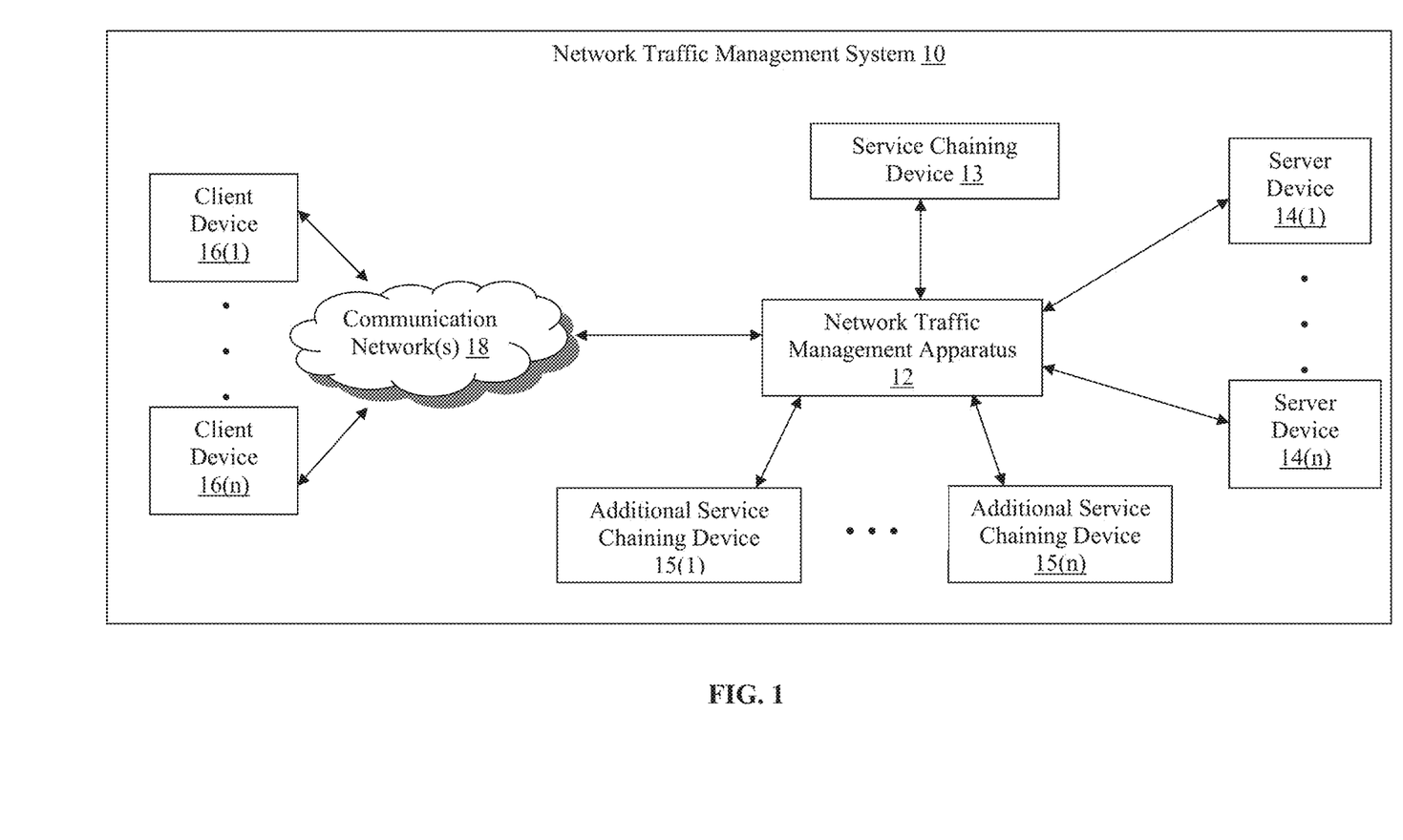
FIG. 1 is a block diagram of an exemplary network traffic management system with a network traffic management apparatus.

An exemplary network environment which incorporates an exemplary network traffic management system 10 is illustrated in FIG. 1. The network traffic management system 10 in this example includes a network traffic management apparatus 12 that is coupled to a service chaining device 13, a plurality of additional service chaining devices 15(1)-15(n), a plurality of server devices 14(1)-14(n), and a plurality of client devices 16(1)-16(n) via communication network(s) 18, although the network traffic management apparatus 12, server devices 14(1)-14(n), and/or client devices 16(1)-16(n) may be coupled together via other topologies. Additionally, the network traffic management system 10 may include other network devices such as one or more routers and/or switches, for example, which are well known in the art and thus will not be described herein. This technology provides a number of advantages including methods, non-transitory computer readable media, network traffic management systems, and network traffic management apparatuses that dynamically provide service chaining of devices where services are enabled as needed based on analysis of the response prior to final transmission of the modified response to the requesting client.

In this particular example, the network traffic management apparatus 12, the service chaining device 13, the server devices 14(1)-14(n), the additional service chaining devices 15(1)-15(n), and the client devices 16(1)-16(n) are disclosed in FIG. 1 as dedicated hardware devices. However, one or more of the network traffic management apparatus 12, the service chaining device 13, the server devices 14(1)-14(n), the additional service chaining devices 15(1)-15(n), or the client devices 16(1)-16(n) can also be implemented in software within one or more other devices in the network traffic management system 10. As used herein, the term "module" refers to either an implementation as a dedicated hardware device or apparatus, or an implementation in software hosted by another hardware device or apparatus that may be hosting one or more other software components or implementations.

As one example, the network traffic management apparatus 12, as well as any of its components, models, or applications, can be a module implemented as software executing on one of the server devices 14(1)-14(n), and many other permutations and types of implementations can also be used in other examples. Moreover, any or all of the network traffic management apparatus 12, the service chaining device 13, the server devices 14(1)-14(n), the additional service chaining devices 15(1)-15(n), and the client devices 16(1)-16(n), can be implemented, and may be referred to herein, as a module.

Figure 2:
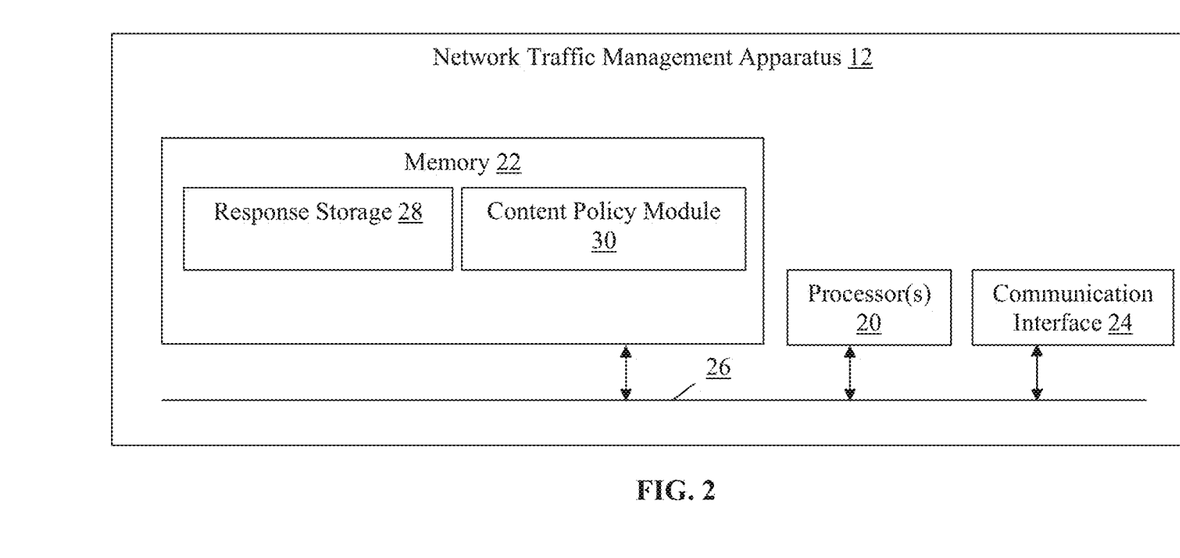
FIG. 2 is a block diagram of an exemplary network traffic management apparatus.

Referring to FIGS. 1-2, the network traffic management apparatus 12 of the network traffic management system 10 may perform any number of functions, including providing network security, load balancing network traffic across the server devices 14(1)-14(n), or accelerating network traffic associated with an application hosted by one or more of the server devices 14(1)-14(n), for example. The network traffic management apparatus 12 in this example includes one or more processor(s) 20, a memory 22, and a communication interface 24, which are coupled together by a bus 26, although the network traffic management apparatus 12 can include other types or numbers of elements in other configurations.

The processor(s) 20 of the network traffic management apparatus 12 may execute programmed instructions stored in the memory 22 of the network traffic management apparatus 12 for the any number of the functions identified above. The processor(s) 20 of the network traffic management apparatus 12 may include one or more CPUs or general purpose processors with one or more processing cores, for example, although other types of processor(s) can also be used.

The memory 22 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Figure 3:
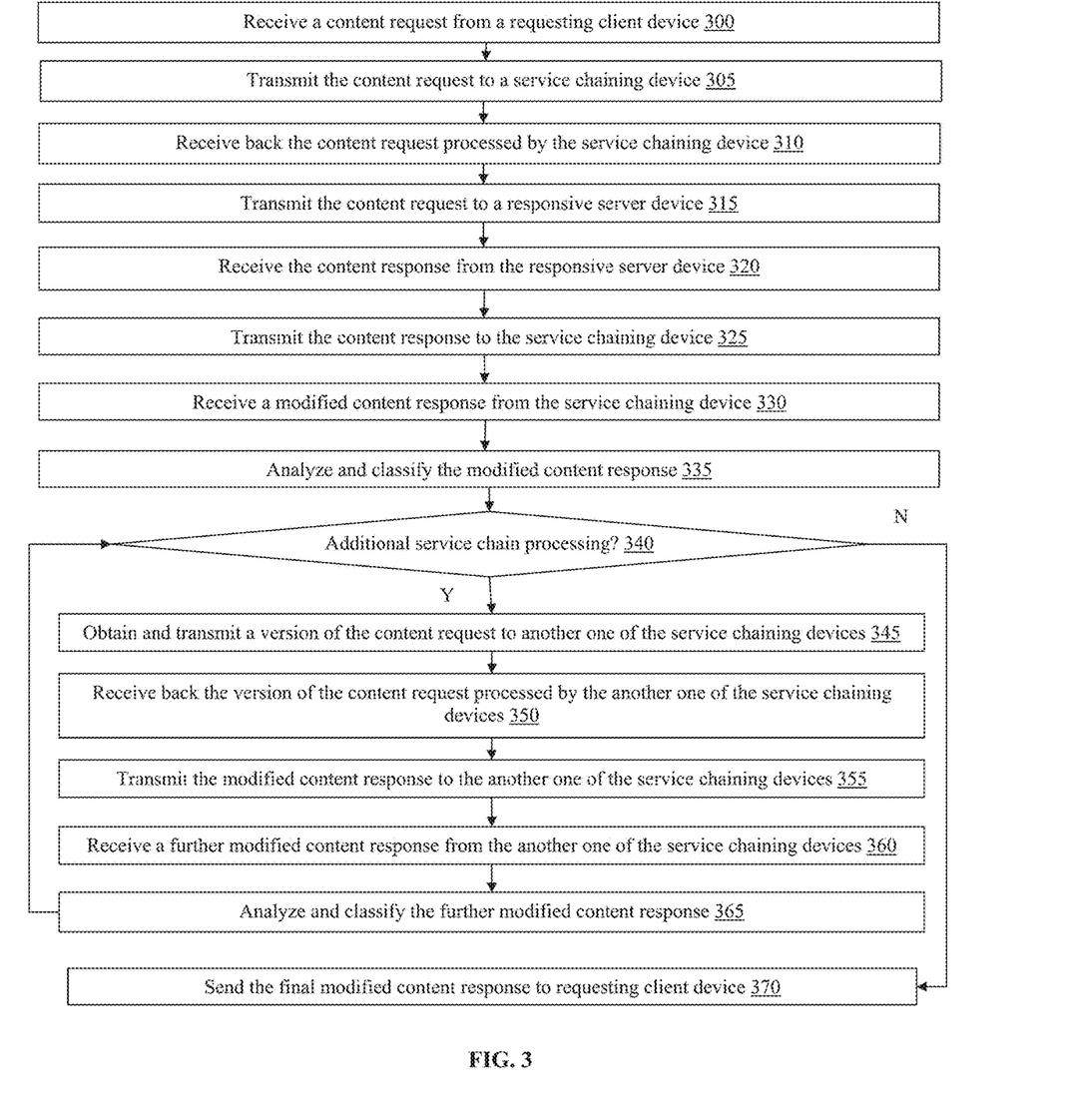
FIG. 3 is a flowchart of an exemplary method for service chaining through Just-In-Time (JIT) virtual hosting.
Figure 4:
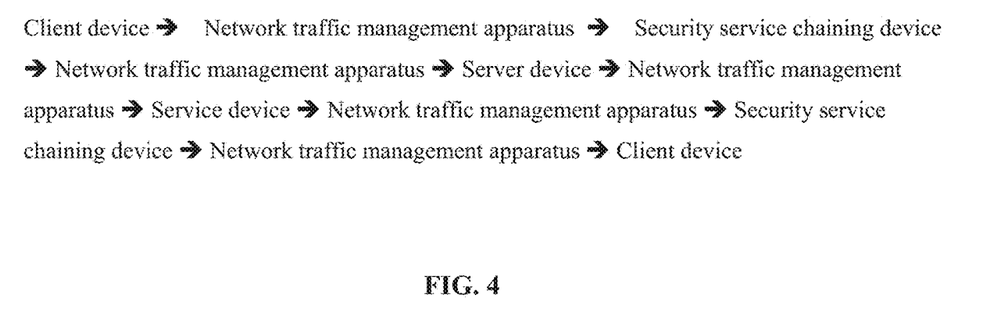
FIG. 4 is a functional diagram of illustrating an exemplary chain service processing flow between devices.

Accordingly, the memory 22 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-4. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more examples of this technology, virtual machine(s) running on the network traffic management apparatus 12 may be managed or supervised by a hypervisor.

In this particular example, the memory of the network traffic management apparatus 12 includes a response storage 28 and content policy module 30, although the memory 22 can include other policies, modules, databases, or applications, for example. The response storage 28 is a data store, which stores copies of server responses sent by client devices 16(1)-16(n). The server responses may include modified server responses. The content policy module 30 stores policies associated with file types included in a client requested by the client devices 16(1)-16(n).

The response storage 28 stores server responses received from client devices 16(1)-16(n). The network traffic management apparatus 12 receives client requests from client devices 16(1)-16(n), requesting content at one or more server devices 14(1)-14(n). When the network traffic management apparatus 12 receives the server responses, the network traffic management apparatus 12 stores copies of the original server responses in response storage 28. These copies of the server responses are then utilized later by the network traffic management apparatus 12 as explained in detail below in FIGS. 3-4.

The content policy module 30 stores policies associated with file types included in a client requested by the client devices 16(1)-16(n). The file types may include, for example, video files, image files, Microsoft word files, Microsoft excel files, Microsoft PowerPoint presentation files, PDF documents, .ISO image files, text files, any presentation files, although other numbers and/or types of file types could be used. The policies associated with these file types may include, for example, to forward client requests to the additional service chaining devices 15(1)-15(n) that request word document files, excel files, PowerPoint presentation files, PDF documents and not to forward client requests to additional service chaining device that request ISO image files and video files, although any other numbers and/or types of policies could be used.

Referring back to FIGS. 1-2, the communication interface 24 of the network traffic management apparatus 12 operatively couples and communicates between the network traffic management apparatus 12, the service chaining device 13, the server devices 14(1)-14(n), the additional service chaining devices 15(1)-15(n), and the client devices 16(1)-16(n) are all coupled together by the communication network(s) 18, although other types and/or numbers of communication networks or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one or more of the service chaining device 13, the server devices 14(1)-14(n), or the additional service chaining devices 15(1)-15(n), for example. Moreover, one or more of the devices of the network traffic management apparatus 12 in these examples can be in a same or a different communication network including one or more public, private, or cloud networks, for example.

The service chaining device 13 of the network traffic management system 10 in this example includes one or more processors, a memory, and a communication interface, which are coupled together by a bus or other communication link, although other numbers and/or types of network devices could be used. The service chaining device 13 in this example process requests received from the client devices 16(1)-16(n) via the network traffic management apparatus 12. Further the service chaining device 13 utilizes policies stored in the memory to evaluate which additional services, such as security services by way of example, should be applied to the service chain flow during the processing of client request by adding additional devices into the service chain flow. The service chaining device 13 evaluates the client request received from the client devices 16(1)-16(n) via the network traffic management apparatus 12 and evaluates and modifies the server response. Based on the determined file type the service chaining device 13 may add additional service chaining devices to service the client request based on the requirement associated with the file type. The service chaining device 13 may be hardware or software or may represent a system with multiple servers in a pool, which may include internal or external networks.

Although the service chaining device 13 of the network traffic management system 10 is illustrated as a single device, a plurality of service chaining devices, such as additional service chaining devices 15(1)-15(n) may be included and each of the plurality of service chaining devices maybe coupled by a bus or other communication link to each other and to the network traffic management apparatus. One or more actions of each of the service chaining devices may be distributed across one or more distinct network computing devices that together comprise one or more of the service chaining devices. Moreover, the service chaining devices are not limited to a particular configuration. Thus, the service chaining devices may contain a plurality of network computing devices that operate using a master/slave approach, whereby one of the network computing devices of the service chaining devices operate to manage and/or otherwise coordinate operations of the other network computing devices. The service chaining devices may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the service chaining devices can operate within the network traffic management apparatus 12 itself rather than as a stand-alone server device communicating with the network traffic management apparatus 12 via the communication network(s) 18. In this example, the service chaining device 13 operate within the memory of the network traffic management apparatus 12.

Each of the server devices 14(1)-14(n) of the network traffic management system 10 in this example includes one or more processors, a memory, and a communication interface, which are coupled together by a bus or other communication link, although other numbers and/or types of network devices could be used. The server devices 14(1)-14(n) in this example can include application servers, database servers, access control servers, or encryption servers, for example, that exchange communications along communication paths expected based on application logic in order to facilitate interactions with an application by users of the client devices 16(1)-16(n).

Accordingly, in some examples, one or more of the server devices 14(1)-14(n) process login and other requests received from the client devices 16(1)-16(n) via the communication network(s) 18(1) and 18(2) according to the HTTP-based application RFC protocol, for example. A web application may be operating on one or more of the server devices 14(1)-14(n) and transmitting data (e.g., files or web pages) to one or more of the client devices 16(1)-16(n) (e.g., via the network traffic management apparatus 12) in response to one or more requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain network computing devices that operate using a master/slave approach, whereby one of the network computing devices of the server devices 14(1)-14(n) operate to manage or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via communication network(s) 18. In this example, the one or more of the server devices 14(1)-14(n) operate within the memory 22 of the network traffic management apparatus 12.

The additional service chaining devices 15(1)-15(n) of the network traffic management system 10 in this example include one or more processors, a memory, and a communication interface, which are coupled together by a bus or other communication link, although other numbers and/or types of network devices with other elements could be used. Additionally, in some examples the additional service chaining devices 15(1)-15(n) may be hardware or software or may represent a system with multiple servers in a pool, which may include internal or external networks. Further, the additional service chaining devices 15(1)-15(n) may act as additional service chaining devices to provide additional servicing of the server response to the client request. The additional service chaining devices 15(1)-15(n) may provide further processing of the client request received from the network traffic management apparatus 12 and the associated response from one of the server devices 14(1)-14(n). By way of example, one of the additional service chaining devices 15(1)-15(n) may receive a copy of the client request or another version of the client request, such as a generated or dummy request based on the original client request by way of example, as well as the server response with any modifications by prior servicing chaining from the network traffic management apparatus 12. In response to receiving the copy of the client request or another version of the client request, the one of the additional the service chaining devices 15(1)-15(n) opens up a connection and then sends the copy of the client request or another version of the client request and information about a connection back to the network traffic management apparatus 12. Next, the network traffic management apparatus 12 then forwards the server response to the one of the additional service chaining devices 15(1)-15(n). The one of the additional service chaining devices 15(1)-15(n) may perform additional servicing on the server response, such as an antivirus scanner device or a threat protection service device that performs detection, prevention and removal of malicious threats to the network by way of example only. By way of further example, the one of the additional service chaining devices 15(1)-15(n) may perform a scan on the content included in the server response to detect, prevent and remove threats, from viruses or malicious threats like, for example, malicious browser helper objects (BHOs), browser hijackers, ransomware, keyloggers, backdoors, rootkits, trojan horses, worms, malicious LSPs, dialers, fraud tools, adware and spyware although any other numbers and/or types of viruses or malicious threats are included. After the server response is serviced the one of the additional service chaining devices 15(1)-15(n) forwards the additionally serviced server response back to network traffic management apparatus 12.

Although the plurality of additional service chaining devices 15(1)-15(n) may be coupled by a bus or other communication link to each other and to the network traffic management apparatus 12. One or more actions of each of the additional service chaining devices 15(1)-15(n) may be distributed across one or more distinct network computing devices that together comprise one or more of the additional service chaining devices 15(1)-15(n). Moreover, the additional service chaining devices 15(1)-15(n) are not limited to a particular configuration. Thus, the additional service chaining devices 15(1)-15(n) may contain a plurality of network computing devices that operate using a master/slave approach, whereby one of the network computing devices of the additional service chaining devices 15(1)-15(n) operate to manage and/or otherwise coordinate operations of the other network computing devices. The additional service chaining devices 15(1)-15(n) may operate as a plurality of network computing devices within a cluster architecture, a peer-to peer architecture, virtual machines, or within a cloud architecture, for example. Further, the additional service chaining devices 15(1)-15(n) and the service chaining device 13 can be included within the network traffic management apparatus 12 as one single apparatus and all the functions of these devices can be performed as one single apparatus.

Thus, the technology disclosed herein is not to be construed as being limited to a single environment and other configurations and architectures are also envisaged. For example, one or more of the additional service chaining devices 15(1)-15(n) can operate within the network traffic management apparatus 12 itself rather than as a stand-alone server device communicating with the network traffic management apparatus 12 via the communication network(s) 18. In this example, the one or more service chaining device 13 operates within the memory of the network traffic management apparatus 12.

The client devices 16(1)-16(n) of the network traffic management system 10 in this example include any type of computing device that can exchange network data, such as mobile, desktop, laptop, or tablet computing devices, virtual machines (including cloud-based computers), or the like. Each of the client devices 16(1)-16(n) in this example includes a processor, a memory, and a communication interface, which are coupled together by a bus or other communication link (not illustrated), although other numbers or types of components could also be used.

The client devices 16(1)-16(n) may run interface applications, such as standard web browsers or standalone client applications, which may provide an interface to make requests for, and receive content stored on, one or more of the server devices 14(1)-14(n) via the communication network(s) 18(1) and 18(2). The client devices 16(1)-16(n) may further include a display device, such as a display screen or touchscreen, or an input device, such as a keyboard for example (not illustrated). Additionally, one or more of the client devices 16(1)-16(n) can be configured to execute software code (e.g., JavaScript code within a web browser) in order to log client-side data and provide the logged data to the network traffic management apparatus 12, as described and illustrated in more detail later.

Although the exemplary network traffic management system 10 with the network traffic management apparatus 12, the service chaining device 13, the additional service chaining devices 15(1)-15(n), server devices 14(1)-14(n), client devices 16(1)-16(n), and communication network(s) 18 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network security system 10, such as the network traffic management apparatus 12, the service chaining device 13, server devices 14(1)-14(n), the additional service chaining devices 15(1)-15(n) or client devices 16(1)-16(n), for example, may be configured to operate as virtual instances on the same physical machine. In other words, one or more of the network traffic management apparatus 12, the service chaining device 13, server devices 14(1)-14(n), the additional service chaining devices 15(1)-15(n), or client devices 16(1)-16(n) may operate on the same physical device rather than as separate devices communicating through communication network(s) 18. Additionally, there may be more or fewer network traffic management apparatuses, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon, such as in the memory 22, for one or more aspects of the present technology, as described and illustrated by way of the examples herein. The instructions in some examples include executable code that, when executed by one or more processors, such as the processor(s) 20, cause the processors to carry out steps necessary to implement the methods of the examples of this technology that are described and illustrated herein.

An exemplary method of service chaining through Just-In-Time (JIT) virtual hosting will now be described with reference to FIGS. 1-4. Referring more specifically to FIG. 3, in a first step 300 in this example, the network traffic management apparatus 12 of the network traffic management system 10 receives a client request from one of the client devices 16(1)-16(n). In this example, the received client request is an encrypted client request, although other types of unencrypted requests may be received. The network traffic management apparatus 12 decrypts the encrypted client request which in this example is a request to access content at one of the server devices 14(1)-14(n).

In step 305, the network traffic management apparatus 12 transmits the client request to a service chaining device 13 which acts as a proxy device, although other configurations may be used. The service chaining device 13 may store the client request and then transmit the client request back to the network traffic management apparatus 12, although the service chaining device 13 may execute other operations on the client request and the client request that is returned may include other information, such as information about a connection between network traffic management apparatus 12 and the service chaining device 13.

In step 310, the network traffic management apparatus 12 receives the client request back from the service chaining device 13 along with any information on the connection that may have been provided.

In step 315, the network traffic management apparatus 12 re-encrypts the client request and transmits the encrypted client request to one of the server devices 14(1)-14(n) associated with servicing the client request, although the content may be transmitted in other formats, such as unencrypted.

In step 320, the network traffic management apparatus 12 receives an encrypted server response to the client request from the one of the server devices 14(1)-14(n). Next, if encrypted, the network traffic management apparatus 12 decrypts the encrypted server response to provide access to the content. By way of example, the content in the server response may comprise one or more applications, services, files and/or other data, although other types of content may be included. The network traffic management apparatus 12 may store a copy of this server response in the response storage 28 of the memory 22, although the response may be stored or managed in other manners.

In step 325, the network traffic management apparatus 12 transmits the decrypted server response to a service chaining device 13 to perform an inspection of and possible modify the server response based on one or more service chaining policies at the service chaining device 13. By way of example only, the service chaining device 13 may be a data loss prevention device (DLP) that monitors for potential data breaches and prevents these breaches by inspecting and modifying a header of the server response with content covered by one of the stored service chaining policies relating to security, such as by providing a designation in the header that signifies the security level of the content and that the network traffic management apparatus 12 needs to check the authorization associated with the client request to determine if access to the content is permitted. In other examples, the service chaining device 13 may execute one or more services on the server response, such as running a virus scan and removing any threats in the response to generate a modified server response.

In step 330, the network traffic management apparatus 12 receives the modified server response from the service chaining device 13. Upon receiving the modified server response, the network traffic management apparatus 10 may again store a copy of the modified server response in the response storage 28 of the memory 22, although this response may be stored or managed in other manners.

In step 335, the network traffic management apparatus 12 analyzes the modified server response to determine one of a plurality of classifications that may have been applied to the server response which may then be correlated against stored traffic management policies at the network traffic management apparatus 12 to execute one or more operations, although in some example additional operations on the modified server response may not be performed. By way of example, the network traffic management apparatus 12 may analyze the modified server response to determine based on the modification in the header data that the classification of the server response comprises an excel file or a presentation file. In another example, the network traffic management apparatus 12 may analyze the modified server response to determine based on payload data in data packets in the server response that the classification of the server response comprises an MPEG file, although again other types and manners of analyzing and classifying the content may be used. Additionally, the network traffic management apparatus 12 may further process the modified server response based on the determined classification correlated to one or more network traffic management policies stored in the network traffic management apparatus 12, although other types of operations may be performed or no further action may be executed by the network traffic management apparatus 12 on the modified server response.

In step 340, the network traffic management apparatus 12 determines when one or more additional service chaining devices 15(1)-15(n) need to be included in the service chain to further process the modified server response based on the content in the modified server response. If in step 340 the network traffic management apparatus 12 determines that one or more additional service chaining devices 15(1)-15(n) do not need to be included in the service chain to further process the modified server response, then the No branch is taken to step 370. In step 370, the network traffic management apparatus 12 re-encrypts the final modified server response and sends the encrypted final modified server response to the requesting one of the client devices 16(1)-16(n) and then this example of the method may end here.

If back in step 340 the network traffic management apparatus 12 determines that one or more additional service chaining devices 15(1)-15(n) need to be included in the service chain to further process the modified server response, then the Yes branch is taken to step 345. In step 345, the network traffic management apparatus 12 sends a version of the client request to one of the additional service chaining devices 15(1)-15(n), such as a copy of the original client request to the one of the additional service chaining devices 15(1)-15(n) or a newly generated or dummy request based on the on the original client request, although other types and/or versions of the client request may be obtained and sent.

In step 350, the network traffic management apparatus 12 receives back the copy or other version of the client request back from the one of the additional service chaining devices 15(1)-15(n) and may also receive information about a connection between the network traffic management apparatus 12 and the one of the additional service chaining devices 15(1)-15(n), although other types of information may be provided.

In step 355, the network traffic management apparatus 12 forwards the modified server response to the one of the additional service chaining devices 15(1)-15(n). The one of the additional service chaining devices 15(1)-15(n) may perform additional servicing on the server response, such as an antivirus scanner device or a threat protection service device that performs detection, prevention and removal of malicious threats to the network by way of example only, although other types of processing or modification of the server response may be executed. The one of the additional service chaining devices 15(1)-15(n) forwards the an additionally modified server response back to the network traffic management apparatus 12.

In step 360, the network traffic management apparatus 12 receives an additionally modified server response from the one of the additional service chaining devices 15(1)-15(n). Upon receiving the modified server response, the network traffic management apparatus 10 may again store a copy of the modified server response in the response storage 28 of the memory 22, although this response may be stored or managed in other manners.

In step 365, the network traffic management apparatus 12 analyzes the additionally modified server response to determine one of a plurality of classifications that may have been applied to the server response which may again be correlated against stored traffic management policies at the network traffic management apparatus 12 to execute one or more operations, although in some example additional operations on the modified server response may not be performed. Next, this example of the method returns to step 340 as described earlier.

Accordingly, as illustrated and described by way of the examples herein, this technology is able to dynamically provide service chaining of devices where services are enabled as needed based on analysis prior to transmission of the modified response to the requesting client. With this technology, the requests are transmitted between the network traffic management apparatus and the service chaining devices in a manners so that only the responses are modified. As a result, any number of services can be seamlessly chained together with no externally visible side effects, such as redirects or duplicate requests.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for service chaining through virtual hosting implemented by a network traffic management system comprising one or more network traffic management modules, server modules, additional service modules, security service chaining modules or client modules, the method comprising:
   sending a server response to a client request from a requesting client device to a service chaining device;
   receiving a modified server response from the service chaining device based on a correlation of the server response to one or more stored service policies;
   determining when the modified server response requires additional processing by one or more additional service chaining devices based on the modified server response;
   receiving the processed server response from the one or more additional service chaining devices when the determination indicated processing was required; and
   transmitting the processed server response to the requesting client device.

2. The method of claim 1, further comprising:
   sending a version of the client request to one of the one or more additional service chaining devices when the determination indicated processing was required; and
   receiving the version of the client request back from the one of the one or more additional service chaining device; and
   sending the modified server response to the one of the one or more additional service chaining devices for the additional processing to generate the processed server response.

3. The method of claim 1, wherein the determining when the modified server response requires additional processing by one or more additional service chaining devices is further based on a correlation of a modified header field in the modified server response from the service chaining device to one or more additional services by the one or more additional service chaining devices.

4. The method of claim 1, wherein the determining when the modified server response requires additional processing by one or more additional service chaining devices is further based on a correlation of content in payload packets in the modified server response to one or more additional services by the one or more additional service chaining devices.

5. The method of claim 1, wherein one of the one or more additional services comprises antivirus processing.

6. A network traffic management apparatus, comprising memory comprising programmed instructions stored thereon and one or more processors configured to be capable of executing the stored programmed instructions to:
   send a server response to a client request from a requesting client device to a service chaining device;
   receive a modified server response from the service chaining device based on a correlation of the server response to one or more stored service policies;
   determine when the modified server response requires additional processing by one or more additional service chaining devices based on the modified server response;
   receive the processed server response from the one or more additional service chaining devices when the determination indicated processing was required; and
   transmit the processed server response to the requesting client device.

7. The apparatus of claim 6, wherein the programmed instructions are further configured to be capable of executing the stored programmed instructions to:
   send a version of the client request to one of the one or more additional service chaining devices when the determination indicated processing was required; and
   receive the version of the client request back from the one of the one or more additional service chaining device; and
   send the modified server response to the one of the one or more additional service chaining devices for the additional processing to generate the processed server response.

8. The apparatus of claim 6, wherein the determine when the modified server response requires additional processing by one or more additional service chaining devices is further based on a correlation of a modified header field in the modified server response from the service chaining device to one or more additional services by the one or more additional service chaining devices.

9. The apparatus of claim 6, wherein the determine when the modified server response requires additional processing by one or more additional service chaining devices is further based on a correlation of content in payload packets in the modified server response to one or more additional services by the one or more additional service chaining devices.

10. The apparatus of claim 6, wherein one of the one or more additional services comprises antivirus processing.

11. A non-transitory computer readable medium having stored thereon instructions for service chaining comprising executable code which when executed by one or more processors, causes the one or more processors to:
    send a server response to a client request from a requesting client device to a service chaining device;
    receive a modified server response from the service chaining device based on a correlation of the server response to one or more stored service policies;
    determine when the modified server response requires additional processing by one or more additional service chaining devices based on the modified server response;
    receive the processed server response from the one or more additional service chaining devices when the determination indicated processing was required; and
    transmit the processed server response to the requesting client device.

12. The non-transitory computer readable medium of claim 11, wherein the instructions for service chaining further comprise executable code which when executed by one or more processors, causes the one or more processors to:
    send a version of the client request to one of the one or more additional service chaining devices when the determination indicated processing was required; and
    receive the version of the client request back from the one of the one or more additional service chaining device; and
    send the modified server response to the one of the one or more additional service chaining devices for the additional processing to generate the processed server response.

13. The non-transitory computer readable medium of claim 11, wherein the determine when the modified server response requires additional processing by one or more additional service chaining devices is further based on a correlation of a modified header field in the modified server response from the service chaining device to one or more additional services by the one or more additional service chaining devices.

14. The non-transitory computer readable medium of claim 11, wherein the determine when the modified server response requires additional processing by one or more additional service chaining devices is further based on a correlation of content in payload packets in the modified server response to one or more additional services by the one or more additional service chaining devices.

15. The non-transitory computer readable medium of claim 11, wherein one of the one or more additional services comprises antivirus processing.

16. A network traffic management system, comprising one or more network traffic management modules, server modules, additional service modules, security service chaining modules or client modules, memory comprising programmed instructions stored thereon and one or more processors configured to be capable of executing the stored programmed instructions to:
    send a server response to a client request from a requesting client device to a service chaining device;
    receive a modified server response from the service chaining device based on a correlation of the server response to one or more stored service policies;
    determine when the modified server response requires additional processing by one or more additional service chaining devices based on the modified server response;
    receive the processed server response from the one or more additional service chaining devices when the determination indicated processing was required; and
    transmit the processed server response to the requesting client device.

17. The network traffic management system of claim 16, wherein the programmed instructions are further configured to be capable of executing the stored programmed instructions to:

send a version of the client request to one of the one or more additional service chaining devices when the determination indicated processing was required; and receive the version of the client request back from the one of the one or more additional service chaining device; and send the modified server response to the one of the one or more additional service chaining devices for the additional processing to generate the processed server response.

18. The network traffic management system of claim 16, wherein the determine when the modified server response requires additional processing by one or more additional service chaining devices is further based on a correlation of a modified header field in the modified server response from the service chaining device to one or more additional services by the one or more additional service chaining devices.

19. The network traffic management system of claim 16, wherein the determine when the modified server response requires additional processing by one or more additional service chaining devices is further based on a correlation of content in payload packets in the modified server response to one or more additional services by the one or more additional service chaining devices.

20. The network traffic management system of claim 19, wherein one of the one or more additional services comprises antivirus processing.

* * * * *